Figure 1:
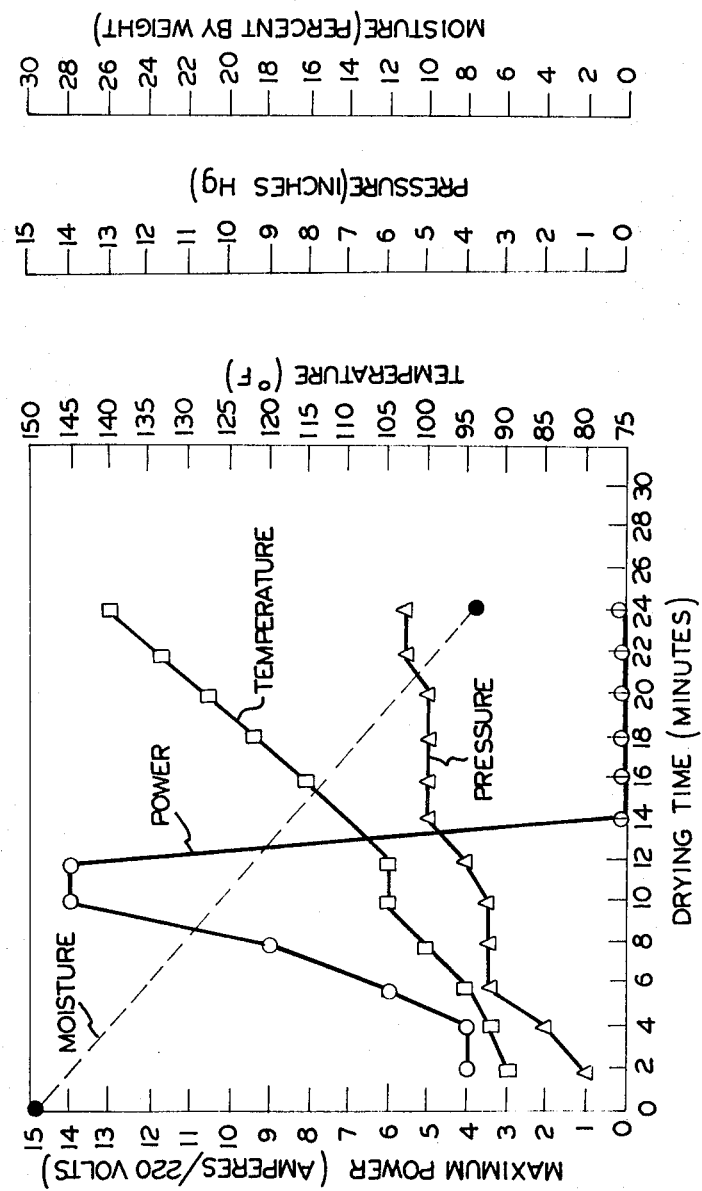

United States Patent

[11] 3,604,123

[72] Inventor William H. King
 Metairie, La.
[21] Appl. No. 24,312
[22] Filed Mar. 31, 1970
[45] Patented Sept. 14, 1971
[73] Assignee The United States of America as represented by the Secretary of Agriculture

[54] PROCESS FOR DRYING WET VEGETABLE PROTEIN PRODUCTS
 2 Claims, 3 Drawing Figs.
[52] U.S. Cl.................................................. 34/9, 34/12
[51] Int. Cl.................................................. F26b 3/00, F26b 7/00
[50] Field of Search........................................... 34/9, 12

[56] References Cited
UNITED STATES PATENTS
2,352,037 6/1944 Thornley et al................ 34/9
2,472,267 6/1949 Reitz............................ 34/9

Primary Examiner—John J. Camby
Attorneys—R. Hoffman and W. Bier

ABSTRACT: This invention relates to an improved process for removing water from wet vegetable protein products such as those resulting from absorption of reaction medium during wet processing of the natural vegetable proteinaceous material, which process involves raising the pH of the material within the range 7.0 to 9.0 or alternatively lowering the pH within the range 4.0–5.0.

PROCESS FOR DRYING WET VEGETABLE PROTEIN PRODUCTS

A nonexclusive, irrevocable, royalty-free license in the invention described herein, throughout the world for all purposes of the United States Government, with the power to grant sublicenses for such purposes, is hereby granted to the Government of the United States of America.

This invention relates to an improved process for removing water from wet vegetable protein products such as those resulting from absorption of reaction medium during wet processing of the natural vegetable proteinaceous material.

The main object of this invention is to provide a practical process for dehydrating aqueous mixtures containing vegetable protein under conditions which avoid damage to the protein.

A further object of the invention is to provide a means for removing water from vegetable protein mixtures resulting from processing vegetable protein-bearing grains and oil seeds whether defatted or undefatted, which have been processed in the presence of relatively large quantities of water used as a reaction or processing medium. Said dehydration is accomplished at relatively low temperatures to avoid heat damage to desirable properties of the protein contained therein. When comminuted vegetable protein-bearing material is brought into contact with aqueous reaction and/or processing mixtures such as water, dilute aqueous solutions of alkalies or acids, or salts such as sodium, potassium and lithium hydroxides, carbonates, phosphates, acetates and the like, hydrogen peroxide, sulfur dioxide, or other oxidizing or reducing agents, the hydrophilic protein components in the natural grains and seeds absorb water, swell, and become plastic and sticky. The resulting gummy material is difficult to dry by an ordinary means. If heat is applied to discrete particles of such material "case hardening" occurs which prevents migration of moisture to the surface of the particles so as to expose the moisture to a dehydrating atmosphere. A dehydrating atmosphere may be either continuously changing dry air or reduced pressure alone. The optimum combination used is dependent on the desired maximum temperature of drying and the nature of the drying equipment used. Furthermore, warming discrete particles of vegetable protein-water mixtures may cause the mixture to become plastic and assume a continuous, homogeneous phase. When agitation is used, so as to continuously expose moist surfaces of the mixture to the dehydrating atmosphere, drying occurs; but a stage is reached when the moisture content is reduced to the range from about 10 percent to about 20 percent (depending on the character of the components of the mixture and the nature and magnitude of the applied mechanical forces) which requires excessive mechanical force to stir, tear, break, and/or cut the mixture so as to expose fresh, moist surfaces to the dehydrating atmosphere.

I have discovered that by adding a small amount of nonvolatile acid or alkali, during or prior to the drying operation, to the moist proteinaceous material to give a pH of about from 7.0 to 9.0 when alkali is used and a pH of about from 4.0 to 5.5 when acid is used, either before or after removal of part of the water by distillation, this tough, and extremely hard, brittle stage is avoided and comminution of the continuous phase of homogeneous plastic material occurs at moderate and practical expenditure of mechanical power, at the same time converting the mixture into a granular meal which is easy to handle and which can be further dried to any desired moisture content by conventional methods.

In carrying out the details of the present invention, the wet vegetable protein product is subjected to agitation with application of heat of vaporization to the wet mixture, either at ambient or reduced pressure, depending on the maximum temperature desired, to remove the moisture. A suitable proportion of nonvolatile acid such as orthophosphoric acid ($H_3PO_4$), or nonvolatile alkali such as sodium hydroxide (NaOH) is added during thorough mechanical agitation of the mixture either in the beginning or at a later stage of the drying procedure. Other acid or alkaline nonvolatile substances such as citric, tartaric and lactic acids and calcium, potassium, and lithium hydroxide, or their alkaline or acidic salts such as carbonates, and alkaline or acidic phosphates and sulfates may also be used. The chemical agent is added in such a way as to become quickly and intimately mixed with the marc. The addition of only small proportions of the agent (e.g. 0.5 percent to approximately 10 percent by weight of the proteinaceous material in the wet mixture) is sufficient to have a pronounced effect on the physical properties and behavior the the mixture during the agitative drying process. Stickiness of the protein in inhibited and the tough, plastic stage, which would otherwise develop and which would require excessive power to comminute by physical action, is avoided.

This practical and convenient method of removing water from wet comminuted vegetable protein-bearing seeds or grains can be carried out at either ambient (atmospheric) or under reduced pressure (vacuum), depending upon the maximum temperature desired in the interest of protecting the natural protein materials from heat damage. If desired, reduced pressure may be applied to lower the temperature necessary to distill off the amount of water which it is desired to remove.

The use of nonvolatile acids, alkalies and salts not only does not impair the native quality of vegetable proteins but solubilities and ease of disintegration and solution of the materials dried by the instant procedure are enhanced by this drying process. The slight increase or decrease in acidity or basicity of the proteinaceous produce are minimized by the buffering action of the natural proteins of the mixture. No corrosion of conventional processing machinery was evident during any of the experimental work leading to this invention.

Figure 2:
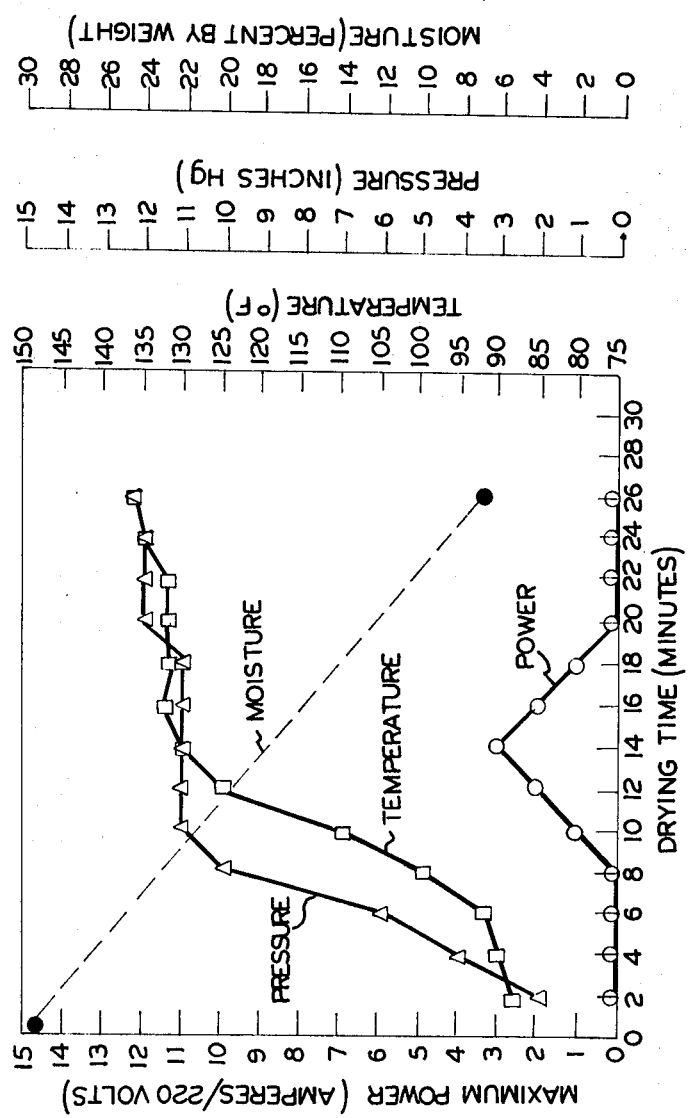
Figure 3:
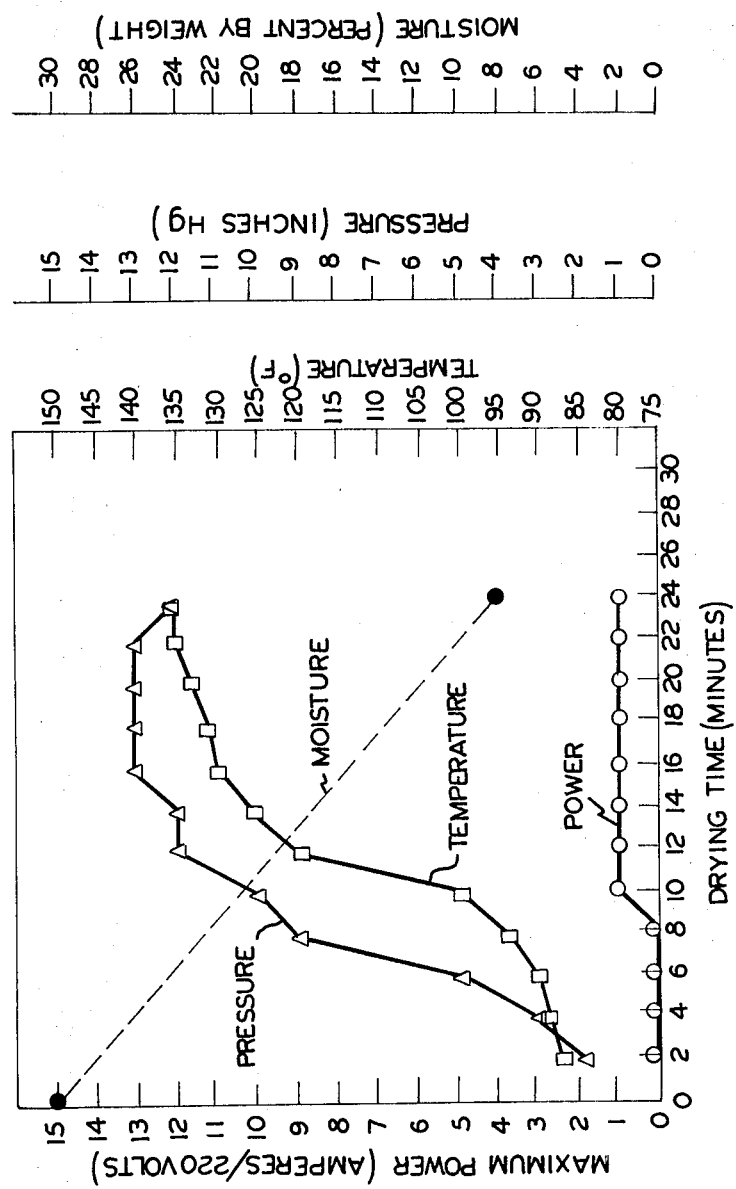

The following examples are illustrative of the details of at least one method of practicing the invention, but should not be construed as limiting the invention in any manner whatever. In the accompanying drawing FIG. 1 shows the relationship of drying time, drying temperature, pressure inside the drying vessel, power requirements for keeping the material being dried agitated, and the moisture content of the material being dried, the notable feature of FIG. 1 being the fact that as the drying progresses, the power requirement rises sharply;

FIG. 2 depicts the same information as does FIG. 1, showing particularly the effect of raising the pH of the material being dried, and whereas the amperage (FIG. 1) increased to 14, without alteration of the pH, the addition of sodium hydroxide to the material being dried, which addition increased the pH from 6.3 to 78, allowed the process to proceed with amperage demands not exceeding 3; and FIG. 3 represents the same information as does FIGS. 1 and 2 but in the case of the material being dried (FIG. 3), acid has been added so that the pH was brought down from 6.3 to 4 or 5, and under the influence of the lowered pH, the amperage requirements for stirring the material undergoing drying did not exceed about 1.

EXAMPLE 1

Five pounds of defatted cottonseed flaked meats containing 30 percent of water were placed in a Baker-Perkins laboratory mixer (Baker-Perkins, Inc., Saginaw, Mich.).

This equipment is a steam-jacketed steel mixer equipped with a vaportight removable cover. It consists of a cubical mixing chamber with two rotating sigma blades which knead, or mix, the contents of the chamber, depending on the physical state of the charge. The bottom of the chamber contains two close-fitting, rounded channels which provide minimum clearance for the rotating Z-shaped blades designed to insure complete mixing of the contents. These rotating blades are vacuum sealed and are rotated by a 220 v. electric motor through a speed-reducing link-belt drive. The blades are hollow and are heated by steam passing through them. The capacity of the mixing chamber is one half cubic foot—part of which is occupied by the mixing blades. The steam jacket was preheated to a temperature of 350° F., and maintained at this temperature throughout the drying operation. Rotation of the mixing blades was started immediately upon addition of the charge and was continued until the dried material was discharged. The apparatus is equipped with a vacuum gauge and a thermometer well. The latter extends into the material being agitated and dried. The boxlike chamber can be tilted over on its side to discharge the dried material, after the vacuum is released and the cover is removed. Vacuum was applied to the system from a steam aspirator line, The material being stirred became plastic, viscous and doughlike, and the electric current required to keep the motor running, as measured by an ammeter in series with the 220 v. power line to the motor, varied as shown in FIG. 1.

The time of stirring and the pressure within the chamber, as well as the temperature of the mass of material being dried, are also shown in this figure. It will be noted that as the drying progresses the power, measured in amperes of electric current at 220 v., rises sharply as the moisture is reduced. Then, as the tough material breaks up the power drops to that required to operate the electric motor while it is simply idling.

EXAMPLE 2

In some instances it was impossible to complete the drying cycle under these conditions. For example, another 5-pound charge of the same material was treated in the same manner. This time the hard, tough, semiplastic mass, after drying for 9 minutes, jammed the mixing blades and stopped the motor, which had an overload cutoff. The material had to be removed from the blades and chamber with a chisel and hammer.

EXAMPLE 3

To show the effect of raising the pH of the moist protein, a 5-pound charge of the same material was placed in the drying apparatus as in the two foregoing examples. Then 30 grams of NaOH dissolved in 150 ml. of water were added when stirring began. Due to the efficient mixing action of the apparatus, this reagent was immediately distributed throughout the plastic mass. The cover was replaced, vacuum was applied, and the electric current data of FIG. 2 were obtained. The comminuted, soft, granular, free-flowing meal which was discharged from the apparatus was found by analysis to contain 7 percent moisture.

EXAMPLE 4

Another 5-pound charge was treated with 25 ml. ((43g.) of 85 percent $H_3PO_4$ (orthophosphoric acid) made to 100 ml. with water. The time, temperature, pressure and power relationships are shown in FIG. 3.

The comminuted, soft, free-flowing, granular meal was found to contain 8 percent moisture.

From this data is can be seen that the addition of either a nonvolatile alkali (e.g. NaOH) or nonvolatile acid (e.g. $H_3PO_4$) has a pronounced beneficial effect on the physical properties of moist, plastic, oilseed protein masses under conditions of agitative drying. This effect is manifested in the rheological properties of the mixture causing a reduction in force required to comminute the material. The hardening into a tough, semisolid material which requires excessive power to comminute into particles suitable for further drying in conventional processing equipment is thus eliminated.

The use of nonvolatile acid or alkali not only does not impair the properties of the dried protein product but has been found to actually increase the solubility and ease of disintegration and dispersibility in aqueous systems. The pH of natural cottonseed protein is 6.3. The slight increase (pH 7–8), or decrease (pH 4–8) in basicity or acidity of the proteinaceous product of the process is minimized by the buffering action of the natural proteins of the mixture. No corrosion of conventional processing machinery was evident during any of the experimental work.

I claim:

1. A process for drying wet protein-bearing vegetable seeds and grains whereby the power required for agitative dehydration is substantially reduced, comprising:
   a. mixing the wet protein mixture with a sufficient amount of nonvolatile alkali to obtain a pH of from about 7.0 to 9.0, the said mixing being carried out with continuous agitation and application of heat to supply heat of vaporization to the water of the mixture, and
   b. drying the mixture with agitation, until the moisture content of the finished meal is about from 7 percent to 10 percent.

2. A process for drying wet protein-bearing vegetable seeds and grains whereby the power required for agitative dehydration is substantially reduced, comprising:
   a. mixing the wet protein mixture with a sufficient amount of nonvolatile acid to obtain a pH of from about 4.0 to 5.0, the said mixing being carried out with continuous agitation and application of heat to supply heat of vaporization to the water of the mixture, and
   b. drying the mixture with agitation, until the moisture content of the finished meal is about from 7 percent to 10 percent.